United States Patent [19]
Dewolf et al.

[11] Patent Number: 5,488,663
[45] Date of Patent: * Jan. 30, 1996

[54] ENCODING METHODS FOR GENERATING A DIGITAL SIGNAL CONTAINING MODULATED BIT ALLOCATION INFORMATION, AND RECORD CARRIERS CONTAINING THAT SIGNAL

[75] Inventors: Jan Dewolf; Gerardus C. P. Lokhoff; Abraham Hoogendoorn, all of Eindhoven, Netherlands

[73] Assignee: U.S. Philips Corporation, New York, N.Y.

[*] Notice: The portion of the term of this patent subsequent to Dec. 20, 2011, has been disclaimed.

[21] Appl. No.: 285,870

[22] Filed: Aug. 4, 1994

Related U.S. Application Data

[63] Continuation of Ser. No. 11,938, Feb. 1, 1993, Pat. No. 5,375,171.

[30] Foreign Application Priority Data

Feb. 3, 1992 [EP] European Pat. Off. ............. 92200298

[51] Int. Cl.⁶ .................................................. H04L 9/00
[52] U.S. Cl. ................................. 380/49; 380/28; 370/18
[58] Field of Search ................................. 380/49, 48, 28; 370/18

[56] References Cited

U.S. PATENT DOCUMENTS

| | | | |
|---|---|---|---|
| 4,603,413 | 7/1986 | Sinjou et al. ............................. | 369/59 |
| 4,620,311 | 10/1986 | Immink et al. . | |
| 4,757,536 | 7/1988 | Szczutkowski et al. .................. | 380/49 |
| 4,817,146 | 3/1989 | Szczutkowski et al. .................. | 380/49 |
| 4,896,362 | 1/1990 | Veldhuis et al. . | |
| 5,214,678 | 5/1993 | Rault et al. . | |
| 5,267,098 | 11/1993 | Lokhoff . | |
| 5,375,171 | 12/1994 | DeWolf et al. ........................... | 380/49 |

FOREIGN PATENT DOCUMENTS

| | | |
|---|---|---|
| 150082 | 7/1985 | European Pat. Off. . |

(List continued on next page.)

OTHER PUBLICATIONS

R. N. J. Veldhuis et al, "Subband Coding Of Digital Audio Signals", Philips Journal Of Research 44, 329–343, 1989.

(List continued on next page.)

Primary Examiner—David C. Cain
Attorney, Agent, or Firm—Richard A. Weiss

[57] ABSTRACT

Transmission system for transmitting and receiving, and subband encoding methods for generating for transmission, digital signals containing modulated bit allocation information; and record carriers containing such a signal. The transmission system include a transmitter which encodes in accordance with the subband encoding method a wide-band digital signal into subband signals which are each made up of successive signal blocks having a predetermined number of samples of that subband signal. The samples in the signal blocks of the subband signals are quantized to produce quantized samples in the signal blocks, and bit allocation information denoting how many bits the samples in the signal blocks are to be quantized by is generated. The bit allocation information (or a portion thereof) is modulated to obtain modulated bit allocation information. The quantized samples in the signal blocks and the modulated bit allocation information are included in a digital signal applied by the transmitter to a transmission medium. The transmission system also includes a receiver for receiving a replica of the digital signal applied to the transmission medium. The modulated bit allocation information is demodulated to obtain the bit allocation information. The quantized samples in the signal blocks and the bit allocation information are used to obtain replicated samples in the signal blocks which substantially correspond to the original samples in the signal blocks of the subband signals. The replicated samples are used to produce a replica of the original wide-band digital signal.

20 Claims, 3 Drawing Sheets

FOREIGN PATENT DOCUMENTS

| | | |
|---|---|---|
| 289080 | 11/1988 | European Pat. Off. . |
| 402973 | 12/1990 | European Pat. Off. . |
| 400755 | 12/1990 | European Pat. Off. . |
| 9000635 | 10/1991 | Netherlands . |
| 9001127 | 12/1991 | Netherlands . |
| 9001128 | 12/1991 | Netherlands . |
| 9100173 | 9/1992 | Netherlands . |

OTHER PUBLICATIONS

J. E. Savage, "Some Simple Self–Synchoronizing Digital Data Scramblers", The Bell System Technical Hournal, pp. 448–487, Feb. 1967.

J. P. J. Heemskerk & K. A. Schouthamer Immink, "Compact Disc: System Aspects And Modulation", Philips Tech. Rev. 40, 157–164, 1982, No. 6.

IEEE ICASSP 80, vol. 1, 327–331, April 9–11, 1980, M. A. Krasner, "The Critcal Band Coder—Digital Encoding Of Speech Signals Based On Perceptual Requirements Of The Auditory System".

U.S. Application A.

U.S. Application B.

U.S. Application C.

U.S. Application D.

"Low Bit–Rate Coding Of High–Quality Audio Signals", An Introduction To The Mascam System, By G. Theile, G. Stoll And M. Link, EBU Review/Technical, Aug. 1988, No. 230, pp. 158–181.

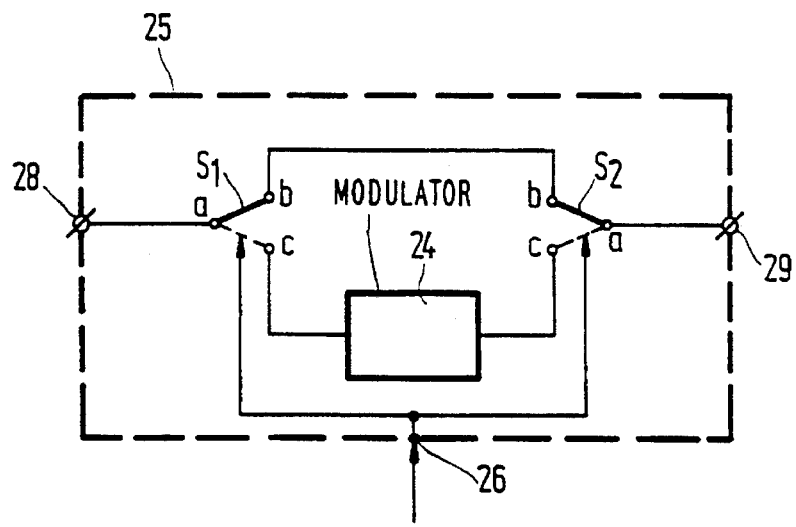
FIG. 4
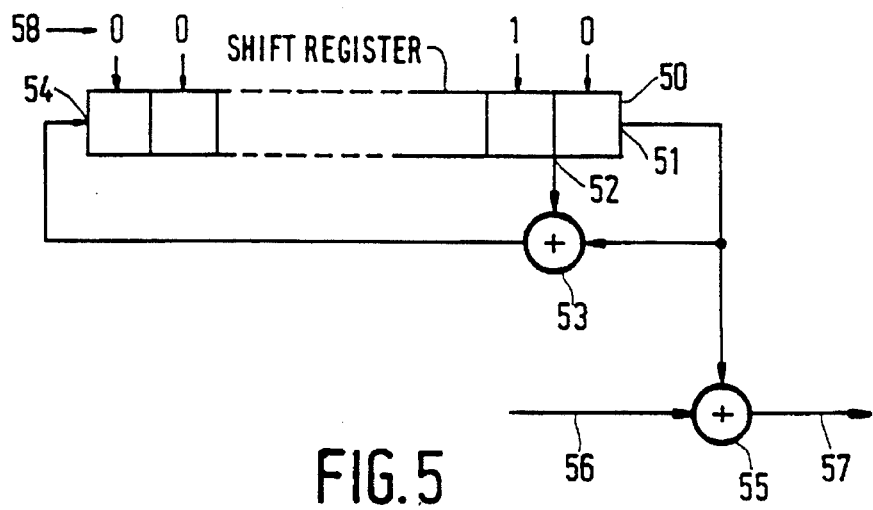
FIG. 5
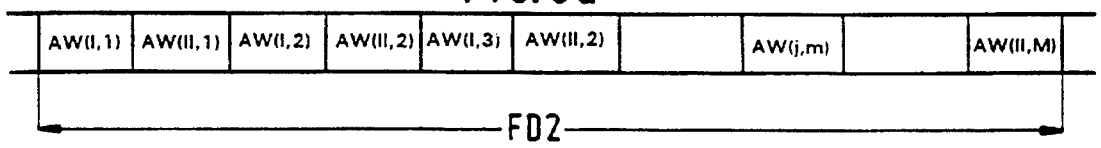
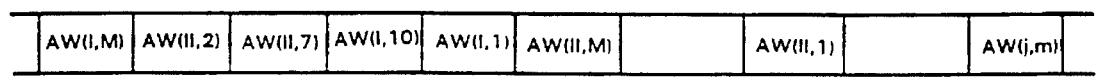
FIG. 6a
FIG. 6b

ENCODING METHODS FOR GENERATING A DIGITAL SIGNAL CONTAINING MODULATED BIT ALLOCATION INFORMATION, AND RECORD CARRIERS CONTAINING THAT SIGNAL

CROSS REFERENCE TO RELATED APPLICATION

This is a continuation of application Ser. No. 08/011,938, filed Feb. 1, 1993, U.S. Pat. No. 5,375,171 issued Dec. 20, 1994.

BACKGROUND OF THE INVENTION

The invention relates to encoding methods for use by a digital transmission system in generating for transmission via a transmission medium, a digital signal representing a wide-band digital signal, for example, a digital audio signal sampled with a specific sample frequency $F_S$. Such a system includes a transmitter having an input terminal for receiving the wide-band digital signal, which input terminal is coupled to an input of a first encoder. The first encoder includes a subband coder responsive to the wide-band digital signal to generate a plurality of M subband signals with sample frequency reduction, for which purpose the subband coder divides the wide-band digital signal into successive subbands having band numbers m which increase as the frequency increases, where $1 \leq m \leq M$; a quantization unit for the blockwise quantization of the respective subband signals to produce quantized samples in the signal blocks, a subband signal being composed of consecutive signal blocks, each signal block comprising q samples; and a bit allocation unit for generating bit allocation information specifying the number of bits representative of each of the q samples in a signal block. The transmitter further comprises a scale-factor information determiner for determining information related to a scale factor belonging to each signal block of a subband signal; a combining unit for combining the quantized samples in the signal blocks, the scale factor information and the bit allocation information in a frame of a second digital signal formed by successive frames; a second encoder for converting the second digital signal into a third digital signal so as to enable the third digital signal to be transmitted via the transmission medium; and an application unit for applying the third digital signal to the transmission medium.

The invention also relates to record carriers containing the signal produced by the transmission system.

A transmission system of the type defined in the opening paragraph is known from European Patent Application No. 04.02.973, which corresponds to U.S. patent application Ser. No. 07/997,158, filed Dec. 21, 1992, and is incorporated herein by reference. The known system is a recording and reproducing system of the DCC type, in which a digital audio signal is recorded in one or more tracks on a magnetic record carrier. Another possible field of use of the invention is digital transmission, such as digital audio broadcasting (DAB).

SUMMARY OF THE INVENTION

It is an object of the invention to provide an encoding method for use by a transmission system in producing a digital signal for transmission in which the information therein is protected from being used by unauthorized persons. To this end, the method in accordance with the invention is characterized in that the bit allocation information in a frame (of the second digital signal) is selectively subjected to a signal processing step involving modulation of the bit allocation information, thereby providing an intermediate digital signal having modulated bit allocation information.

Since the bit allocation information is subjected to an additional signal processing step, the bit allocation information is changed (i.e., mutilated) in such a manner that the bit allocation information cannot be derived correctly from the transmitted signal received by a receiver. As is described with reference to FIG. 12 in European Patent Application No. 04.02.973, the bit allocation information is needed to derive from a serial data stream of a replicated second digital (which substantially corresponds to the second digital signal) signal derived from the transmitted signal received by a receiver the quantized samples in the signal blocks of the subband signals in the different subbands. If the bit allocation information in the replicated second digital signal no longer complies with the standard as described in European Patent Application No. 04.02.973, it is, in fact, no longer possible to determine how many bits represent the quantized samples in the corresponding (i.e., time equivalent) signal blocks of the subband signals in the subbands, so that decoding of the audio information is not possible. A replica of the original wide-band signal can be constructed only if a receiver is capable of processing the bit allocation information it receives in an inverse manner.

The invention can be used, for example, in subscriber radio, where the subscribers have to pay for the received radio programs. Another field of use is in the communication between non-public institutions, for example, in police radio communication, where the information to be transmitted is secret and should not be intelligible to unauthorized persons.

The signal processing step may, for example, be such that the third encoder operates so as to aselectively modulate (i.e., scramble) the bit allocation information in a frame.

The third encoder may operate in either a non-self-synchronize manner. Self-synchronizing modulators (i.e., scramblers) are known per se, for example, from J. E. Savage, "Some simple self-synchronizing digital data scramblers" The Bell System Technical Jrnl., February, 1967, pp. 449–487. Non-self-synchronizing modulators are also known per se from the literature. Non-self-synchronizing modulators are preferred over self-synchronizing modulators because error propagation is not possible with the first type of modulation, while it is with the second type.

The third encoder may operate so as to modulate (i.e., scramble) the bit allocation information before that information has been combined with the scale factor information and the quantized samples in the signal blocks in order to obtain the second digital signal. Another possibility is that the third encoder operate so as to modulate the bit allocation information after it is included in the second digital signal.

It is to be noted that the use of scramblers and descramblers in accordance with the invention in Compact-Disc-like systems is described in U.S. Pat. No. 4,603,413. There, modulation (i.e., scrambling) is effected aselectively in dependence upon the d.c. unbalance in the signal to be transmitted.

Another signal processing possibility for the bit allocation information is to change the sequence of the bit allocation information in a frame. The bit allocation information may then, for example, be subjected to a kind of interleaving. The sequence of the bit allocation information may be changed on a word basis. This means that y-bit code words, which are related to the number of bits representing the quantized samples in corresponding (i.e., time equivalent) signal blocks of the subband signals in the subbands and which the bit allocation information is composed, are not affected themselves, but rather, merely the code word sequence is changed. Interleaving as a possibility of changing the sequence is a step which is known per se and, for example, in the Compact Disc Digital Audio System it is applied to the audio information to be recorded, see Philips Technical Review, Vol. 40, 1982, no. 6, pp. 162–170.

BRIEF DESCRIPTION OF THE DRAWINGS

Some embodiments of the invention will now be described in more detail, by way of example, with reference to the following drawings, in which FIGS. 1a and b show a transmitter in a transmission system in accordance with the invention;

FIG. 4 shows an example of a third encoder;

FIG. 5 shows an example of a non-self-synchronizing modulator (scrambler); and

FIG. 6a shows an original sequence of bit allocation words and FIG. 6b shows a possible sequence after the original sequence has been changed.

DESCRIPTION OF THE PREFERRED EMBODIMENTS

Figure 1A:
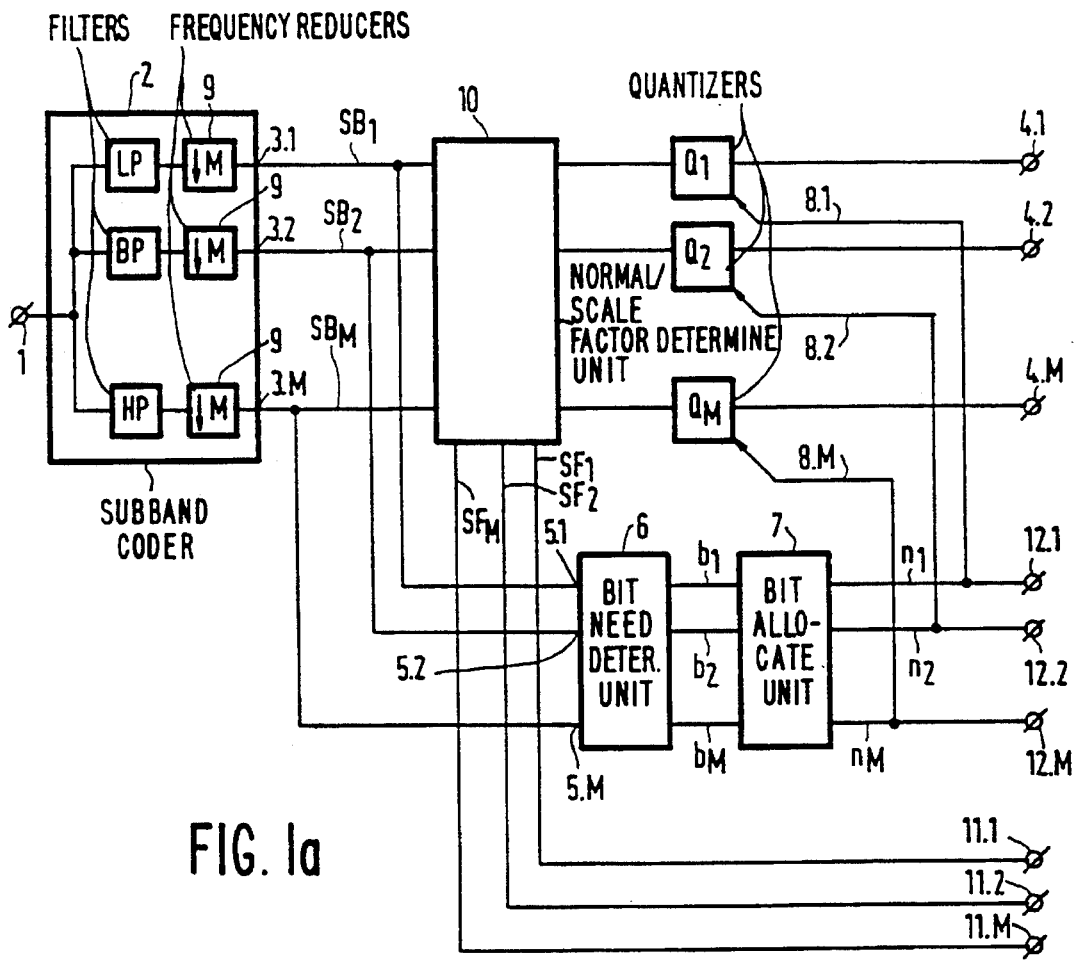

FIG. 1a shows a first encoder of a transmitter. A wide-band digital signal is applied to an input terminal 1 of the first encoder. This wide-band digital signal may be an audio signal may be an audio signal having a bandwidth, for example, of about 20 kHz. The audio signal may be a stereo audio signal. If it is, the discussion which follows is applicable primarily to only one of the two signal portions (i.e., the left-channel signal portion or right-channel signal portion) of the stereo audio signal. For example, 16-bit samples of, for example, the left-channel signal portion of the audio signal having, for example, a 44 kHz sample frequency are applied to the input terminal 1. The other signal portion will then be subject to the same process.

The audio signal (if stereo, the left-channel signal portion, for example,) is applied to a subband coder 2 comprising analysis filters. The subband coder 2 distributes the audio signal over M subbands by means of M filters, i.e., a low-pass filter LP, M-2 band-pass filters BP and a high-pass filter HP, resulting in M subband signals. M is, for example, 32. The sample frequencies of the M subband signals are reduced in frequency reducers 9. In a frequency reducer 9, the sample frequency of a subband signal is reduced by a factor of M. The (reduced frequency) subband signals, thus, obtained are presented at the outputs 3.1, 3.2, . . . 3.M. The subband signal $SB_1$ in the lowest sub-band is presented at the output 3.1. The subband signal $SB_2$ in the next to lowest sub-band is presented at the output 3.2. The subband signal $SB_M$ in the highest subband is presented at the output 3.M. The subband signals at the outputs 3.1 to 3.M take the form of successive samples expressed in 16 or more-bit numbers, for example 24-bit numbers.

In the present exemplary embodiment, the subbands 1 to M are all equally wide. However, this is not necessary. An article by M. A. Krasner, entitled "The Critical Band Coder . . . Digital Encoding of Speech Signals Based on Perceptual Requirements of the Auditory Systems," in Vol. 1, IEEE ICASSP 80, Apr. 8–11, 1980 at pp. 327–328, for example, proposes a division into a plurality of subbands whose bandwidths approximately correspond to the bandwidths of the critical bands of the human auditory system in the respective frequency areas.

The operation of the subband coder 2 will not be explained further because the operation of a subband coder has already been described comprehensively in U.S. Pat. Nos. 4,896,362 and 5,214,678 and the above-mentioned Krasner article, which are all incorporated herein by reference.

The subband signals are each composed of successive signal blocks of q successive samples, for example, q may equal 12, and are applied to associated quantizers $Q_1$ to $Q_M$. In a quantizer $Q_m$, the samples in a signal block are quantized to form quantized samples each having a number of bits $n_m$, which is smaller than 16.

FIG. 1a shows how each of the left-channel subband signals (obtained from the left-channel signal portion), in signal blocks of q successive samples, are applied to an associated quantizer $Q_m$. In a like manner, each of the right-channel subband signals (obtained from the right-channel signal portion), in signal blocks of q successive samples, are applied to an associated quantizer (not shown). During quantization, the signal blocks (groups of q successive samples) of the subband signals are each quantized to a smaller number of bits. In addition, the q samples in each subband signal are first normalized in a signal block. This normalization is effected in a normalization/scale factor unit 10 by dividing the amplitudes of the q samples in a signal block by the amplitude of the sample having the largest absolute value in that signal block. The amplitude of the sample having the largest amplitude in a signal block of a subband signal $SB_m$ produces a scale factor $SF_m$, see European Patent Application No. 04.02.973 of the list of references. Subsequently, the amplitudes of the normalized samples, which are now situated in an amplitude range from −1 to +1 are quantized.

This quantization is discussed extensively in European Patent Application No. 04.02.973, see FIGS. 24, 25 and 26 of that application pertaining thereto and the relevant description. The quantized samples of the subband signals $SB_1$ and $SB_m$ in the subbands 1 to M are then presented at the respective outputs 4.1 to 4.M.

The outputs 3.1 to 3.M are further coupled to the respective inputs 5.1 to 5.M of a bit-need determining unit 6. The bit-need determining unit 6 determines a bit need $b_m$ for each of the time-equivalent q-sample signal blocks of the subband signals $SB_1$ to $SB_M$ in the subbands 1 to M. The bit need $b_m$ is a number which is related to the number of bits with which the q samples in a q-sample signal block of a subband signal should be quantized.

The bit needs $b_1$ to $b_M$ derived by the bit-need determining unit 6 are applied to a bit allocation unit 7. The bit allocation unit 7 determines the actual number of bits $n_1$ to $n_M$ with which each of the q samples in the corresponding (i.e., time-equivalent) signal blocks of the subband signals $SB_1$ to $SB_M$ in the subbands 1 to M are to be quantized on the basis of the bit needs $b_1$ to $b_M$. Control signals corresponding to the numbers $n_1$ to $n_M$ are applied to the respective quantizers $Q_1$ to $Q_M$ via the lines 8.1 to 8.M, so that the quantizers can quantize the samples with the correct numbers of bits.

Dutch Patent Application Nos. 90.01.127 and 90.01.128, which correspond to U.S. patent application Ser. Nos. 08/144,092 and 08/144,093, respectively, filed Oct. 27, 1993, and which are incorporated herein by reference, extensively discuss the operations of the bit-need determining unit 6 and the bit allocation unit 7.

The quantized samples in the signal blocks of the subband signals are subsequently applied to inputs 4.1 to 4.M of a signal combining unit 14. Likewise, bit allocation information formed generally from conversion of the numbers $n_1$ to $n_M$, is applied to inputs 12.1 to 12.M of the combining unit 14. European Patent Application No. 04.02,973 indicates that the numbers in the bit allocation information which represent the number of bits by which the samples have been represented are converted to y-bit code words, where y is 4, see FIG. 9 in European Patent Application No. 04.02,973. Similarly, scale factor information, formed generally from conversion of the scale factors $SF_1$ to $SF_M$ is applied, to inputs 11.1 to 11.M of the combining unit 14.

Figure 1B:
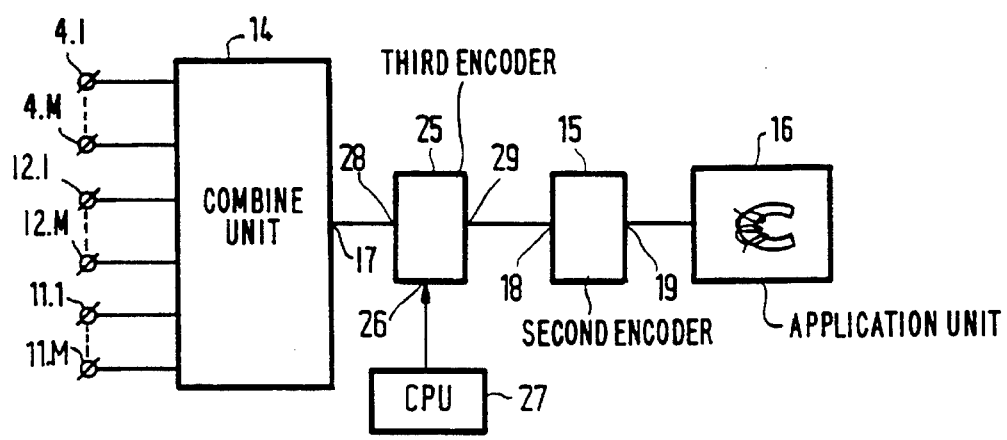

FIG. 1b shows a second part of the transmitter, which includes the combining unit 14, a second encoder 15 and an application unit 16 for applying the signal presented at its input to a transmission medium. In the present case, this transmission medium is a magnetic record carrier.

In addition to the quantized samples, the bit allocation information and the scale factor information for the left-channel subband signals in the subbands, the quantized samples, the bit allocation information and the scale factor information for the right-channel subband signals in the subbands are also applied to the combining unit 14. The combining unit 14 combines the signals and arranges them serially in successive frames of a second digital signal presented at its output 17.

Figure 2:
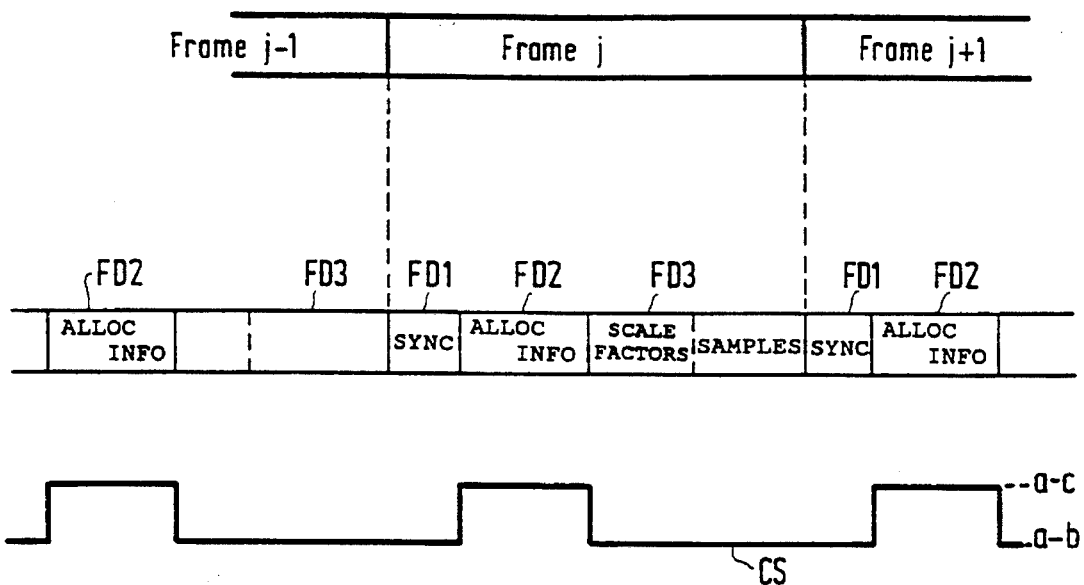
FIG. 2 shows a second digital signal generated by the transmitter.

FIG. 2 shows the format of the second digital signal. This format is described extensively in European Patent Application No. 04.02.973. FIG. 2 shows the second digital signal comprising successive frames j−1, j, j+1 and the format of those frames. The frame j, for example, comprises a first frame portion FD1 in which sync information may be contained, a second frame portion FD2 in which the bit allocation information may be contained and a third frame portion FD3 in which the scale factor information followed by the quantized samples of the subband signals in the subbands may be contained. For a further description reference is made to European Patent Application No. 04.02, 973.

The second digital signal is applied (after modification by a third encoder discussed below) to an input 18 of the second encoder 15 of FIG. 1b. In the second encoder 15, the (modified) second digital signal is encoded to enable it to be error correctable at a receiver end. For this purpose, the second digital signal is subjected to, for example, a Reed Solomon encoding and, if required, interleaving. In addition, the second digital signal is encoded in such a way that the information therein is suitable for transmission through a transmission medium. To this end, for example, an 8-to-10 encoding may be applied to 8-bit words constituting the second digital signal. Such an 8-to-10 conversion is described in, for example, U.S. Pat. No. 4,620,311. During this conversion the 8-bit information words are converted to 10-bit code words.

The second encoder 15 of FIG. 1b outputs, via an output 19, a third digital signal. The output 19 is coupled to an input 20 of the application unit 16, which takes the form of a recorder for recording the third digital signal on a magnetic record carrier.

In an embodiment of the invention, the transmitter comprises a third encoder 25 for aselectively modulating (i.e., scrambling) the bit allocation information in a frame, thereby producing an intermediate digital signal having modulated bit allocation information. The third encoder 25 may be provided at different locations in the transmitter. FIG. 1 shows the third encoder 25 coupled between the output of the combining unit 14 and the input 18 of the second encoder 15. The third encoder is operative only at the instant at which the second frame portions FD2 in the frames are received. For this purpose, a central processing unit CPU 27 supplies a control signal cs, as shown in FIG. 2, which is applied to a control signal input 26 of the third encoder 25.

The third encoder 25 is shown in more detail in FIG. 4. In time intervals in which the control signal cs is 'low', the switches S1 and S2 in the third encoder 25, in FIG. 4, are in position a–b. In this case, the third encoder forms an interconnection so that the signal at the input 28 is applied directly to the output 29. In time intervals in which the control signal cs is 'high', i.e., during the instants at which the second frame portions FD2 are applied to the third encoder 25, the switches S1 and S2 are in position a–c. The bit allocation information is now applied to a modulator (i.e., a scrambler) 24, in which the bit allocation information is modulated (i.e., scrambled) aselectively, after which the modulated bit allocation information is supplied to the output 29.

FIG. 5 shows an example of the modulator 24. In particular, FIG. 5 gives an example of a non-self-synchronizing modulator (i.e., scrambler). The modulator comprises a shift register 50 with a length of, for example, 15 bits. An output 51 of the shift register 50 and an output 52 of a penultimate position in the shift register 50 are coupled to two inputs of a modulo-2 adder 53. The output of the adder 53 is coupled to an input 54 of the shift register 50. The output 51 of the shift register 50 is also coupled to an input of a modulo-2 adder 55. The signal line 56, via which the bit allocation information is applied, is coupled to the other input of the adder 55. The modulated bit allocation information appears on the signal line 57, which is coupled to an output of the adder 55. When a modulation process is started at the transmitter and the shift register is loaded with a starting value 58, for example, all logic "zeros", except for the penultimate position which is a logic "one". When it is assumed that the value 01111001 is applied as the first data block, via the line 56, during the first eight clock pulses in the system (the most significant bit first), the value 11000000 is added to the first-mentioned value in the modulo-2 adder 55, so that the result 10111001 appears on the line 57. It is to be noted that upon every clock pulse two bits of the two values are added to each other in the modulo-2 adder 55.

It is evident that apart from the present example other versions of a non-self-synchronizing modulator are possible. For example, a different starting value may be selected, or outputs of other positions may be coupled to the inputs of the adder 53. In addition, it is not necessary to apply modulation (i.e., scrambling) by means of modulo-2 addition (in the adder 55), however, such modulation has one major advantage: the same circuit can be employed for demodulating (i.e., descrambling) the additionally modulated information at the receiver end. The starting value of the shift register in a demodulator (i.e., a descrambler) at the beginning of the demodulation process must then be the same as the starting value of the modulator during the modulation process. This may be achieved by transmitting (via recording) the starting value used during modulation as information in the record carrier, so that during demodulation this starting value can be read and loaded into the shift register of the demodulator.

Additional modulation and demodulation are illustrated below for an arbitrary data byte D.M is the number with which the data block D is modulated to form the data block D and is subsequently demodulated.

$$
\begin{aligned}
D &= 10001101 \\
M &= \underline{10110101} + \text{(modulo 2)} \\
D_s &= 00111000 \\
M &= \underline{10110101} + \text{(modulo 2)} \\
&\phantom{=\ } 10001101
\end{aligned}
$$

The final result after demodulation is identical to the data byte D.

Instead of non-self-synchronizing modulators/demodulators, it is possible to employ self-synchronizing modulators/demodulators. These are generally known from the literature, (see the previously mentioned Bell System Technical Journal of February, 1967), and therefore they are not discussed in more detail.

Figure 3:
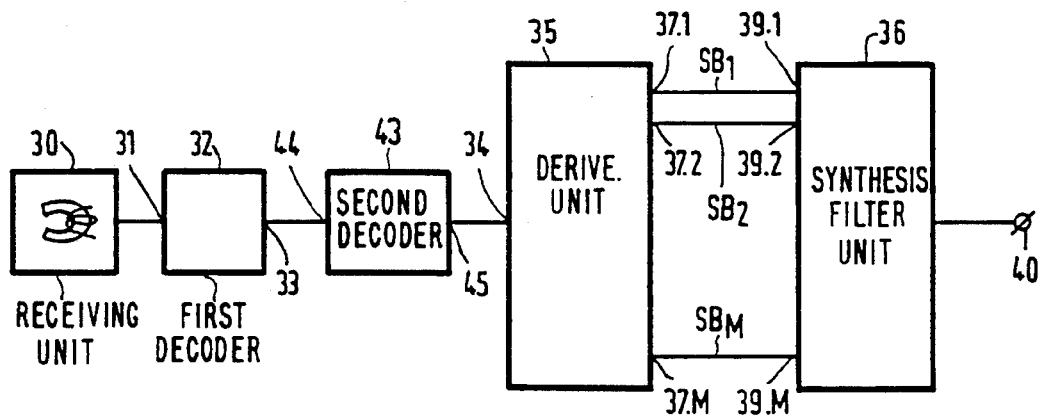
FIG. 3 shows a receiver in accordance with the invention.

FIG. 3 shows diagrammatically an embodiment of a receiving unit in accordance with the invention. The receiver comprises a receiving unit 30 for receiving a replicated third digital signal which substantially corresponds with the third digital signal from the transmission medium. In this case, the receiving unit 30 takes the form of a reader for reading information from a magnetic record carrier. The replicated third digital signal is applied to an input 31 of a first decoder 32, e.g., error correction unit. The first decoder 32 first perform 10-to-8 conversion. Then, an error correction operation is carried out and, possibly, de-interleaving of the information in that signal occurs.

The first decoder 32 of FIG. 3 outputs a replicated intermediate digital signal which substantially corresponds to the first intermediate digital signal, i.e., a decoded signal, which substantially corresponds to the second digital signal shown in FIG. 2 after modulation to include the aselectively modulated bit allocation information. The replicated intermediate digital signal is supplied by the first decoder 32 via an output 33. The replicated intermediate digital signal is applied to an input 44 of a second decoder 43, i.e., a demodulator, which demodulates the bit allocation information in a manner inverse to the modulation of the bit allocation information at the transmitter end in order to restore the original bit allocation information.

A replica of the original second digital signal i.e., a replicated second digital signal appears at an output 45 of the second decoder of FIG. 3 and is applied to an input 34 of a derivation unit 35. The deviation unit 35 derives (from the frames shown in FIG. 2) of the replicated second digital signal the bit allocation information, the scale factor information and the quantized samples in each signal block in each subband signal. After dequantization of the quantized samples, and multiplication by the appropriate scale factors to obtain samples, i.e., replicated samples, substantially corresponding to the original samples in the signal blocks of the subband signals, replicas of the left-channel subband signals $SB_1$ to $SB_M$ appear at outputs 37.1 to 37.M of the derivation unit 35. These subband signals are applied to inputs 39.1 to 39.M of a synthesis filter unit 36, which constructs a replica of the original left-channel signal portion from those subband signals. The operation of the synthesis filter unit 36 is discussed extensively in U.S. Pat. No. 5,214,678. The replica of the original left-channel signal portion is applied by the synthesis filter unit 36 to an output 40 of the receiver. The derivation unit 35 also has M outputs at which replicas of the right-channel subband signals are available. A synthesis filter unit (not shown), such as that of synthesis filter unit 36, is provided to reconstruct a replica of the original right-channel signal portion from those subband signals.

In one embodiment of the invention, the demodulator 43 may operate as shown in FIG. 4, the section bearing the reference numeral 24 now functioning as a demodulator. The switches S1 and S2 are controlled in the same way as described above with respect to the operation of the circuit of FIG. 4 as a modulator at the transmitter end.

If during transmission a self-synchronizing modulator is used, a corresponding self-synchronizing demodulator (i.e., a descrambler) will have to be used during reception. If during transmission a non-self-synchronizing modulator, as described with reference to FIG. 5, is used, a corresponding non-self-synchronizing demodulator will have to be used in the demodulator 43, for example, the circuit shown in FIG. 5, which can also function as a demodulator.

In another embodiment of the invention, the transmitter shown in FIG. 1b comprises a third encoder 25 for changing the sequence of the bit allocation information in a frame. FIG. 6a illustrates a possible sequence for the bit allocation information included in the form of y-bit code words in the second frame portion FD2 of a frame. The y-bits code-words AW(I,1), AW(II,1), AW(I,2), AW(II,2), AW(I,3), AW(II,3), . . . , AW(j,m), . . . , AW(I,M), AW(II,M) are included in that sequence. In European Patent Application No. 04.02.973, the code words AW are represented as 4-bit words. FIG. 6b shows diagrammatically how that sequence can appear after the code words AW have been changed in the third encoder 25, when that change is effected on a word basis. This means that the code words AW themselves are not affected, only their sequence.

If at the receiver end no allowance is made for the changed sequence, the first code word AW(I,M) will be taken to be the code word AW(I,1) and in each part of the third frame portion FD3 which follows the scale factors groups $n_M$ bits, instead of $n_1$ bits, will be combined to obtain the quantized samples in the first subband signal. If $n_1$ is assumed to be 4 and $n_M$ is assumed to be 3, this means that in succession q (this is because there are q samples in one signal block in a subband signal) 3-bit groups will be derived, whereas q 4-bit groups should have been derived. Consequently, the receiver performs an incorrect decoding. Therefore, before a correct decoding is possible, the receiver, i.e., the second decoder 43, should change the sequence received back to the original sequence as illustrated in FIG. 6a. Hence, the manner in which the bit allocation information has been processed in the transmitter should be known at the receiver end.

In principle, there are M! possibilities of changing the sequence in the transmitter. For greater values of M, for example 32, there is a large number of possibilities. As a result, cracking the algorithm on which the sequence change is based is virtually impossible.

It is to be noted that the invention has been described primarily in terms of coding and transmission of a monophonic signal. However, the invention is not restricted to such a signal. The invention may, as suggested throughout, be applied to coding of a stereophonic signal, in which case each subband has two signal portions, i.e. a left-channel signal portion and a right-channel signal portion. The invention may also be applied to coding arrangements in which one or more of the subband signals can be coded in a stereo intensity mode. For an explanation of the stereo intensity mode coding reference is made to European Patent Applications 04.02.973 and 91.00.173. The latter of which corresponds to U.S. application Ser. No. 07/829,789, filed Jan. 31, 1994 and is incorporated by reference herein.

We claim:

1. A method of subband encoding a wide-band digital signal, the method comprising:

generating a plurality of subband signal from the wideband digital signal, each of the subband signals being made up of consecutive signal blocks with each contain a predetermined number of samples of that subband signal;

quantizing the samples in the signal blocks of the subbands signals to produce quantized samples in the signal blocks;

generating bit allocation information denoting how many bits the samples in the signal blocks are to be quantized by;

modulating the bit allocation information or a portion thereof to produce modulated bit allocation information; and generating a digital transmission signal including the quantized samples and the modulated bit allocation information.

2. The method as claimed in claim 1, wherein said modulating is performed by a self synchronizing modulator.

3. The method as claimed in claim 1, wherein said modulating is performed by a non-self synchronizing modulator.

4. The method as claimed in claim 1, wherein said modulating includes selective scrambling of the bit allocation information or the portion thereof which is to be modulated.

5. The method as claimed in claim 1, wherein the bit allocation information or the portion thereof which is to be modulated has a bit sequence, and said modulating includes changing the order of the bit sequence.

6. The method as claimed in claim 1, wherein the bit allocation information or the portion thereof which is to be modulated comprises y-bit words having a word sequence, and said modulating includes changing the order of the word sequence.

7. The method as claimed in claim 1, wherein further comprising applying the digital transmission signal to a transmission medium.

8. The method as claimed in claim 7, wherein said transmission medium is a magnetic record carrier.

9. A record carrier produced by the method of claim 7.

10. The record carrier as claimed in claim 9, wherein the record carrier is a magnetic record carrier.

11. A method of subband encoding a wide-band digital signal, the method comprising:

generating a plurality of subband signal from the wideband digital signal, each of the subband signals being made up of consecutive signal blocks with each contain a predetermined number of samples of that subband signal;

quantizing the samples in the signal blocks of the subbands signals to produce quantized samples in the signal blocks;

generating bit allocation information denoting how many bits the samples in the signal blocks are to be quantized by;

combining the quantized samples in the signal blocks and the bit allocation information relating thereto in successive frames of a second digital signal;

modulating the bit allocation information or a portion thereof in a frame of the second digital signal thereby producing an intermediate digital signal including modulated bit allocation information in a frame thereof; and converting the intermediate digital signal into a digital transmission signal for transmission to a transmission medium.

12. The method as claimed in claim 11, wherein said modulating is performed by a self synchronizing modulator.

13. The method as claimed in claim 11, wherein said modulating is performed by a non-self synchronizing modulator.

14. The method as claimed in claim 11, wherein said modulating includes selective scrambling of the bit allocation information or the portion thereof which is to be modulated.

15. The method as claimed in claim 11, wherein the bit allocation information or the portion thereof which is to be modulated has a bit sequence, and said modulating includes changing the order of the bit sequence.

16. The method as claimed in claim 11, wherein the bit allocation information or the portion thereof which is to be modulated comprises y-bit words having a word sequence, and said modulating includes changing the order of the word sequence.

17. The method as claimed in claim 11, wherein further comprising applying the digital transmission signal to a transmission medium.

18. The method as claimed in claim 17, wherein said transmission medium is a magnetic record carrier.

19. A record carrier produced by the method of claim 17.

20. The record carrier as claimed in claim 19, wherein the record carrier is a magnetic record carrier.

* * * * *